(12) United States Patent
El-Aini et al.

(10) Patent No.: US 7,955,054 B2
(45) Date of Patent: Jun. 7, 2011

(54) INTERNALLY DAMPED BLADE

(75) Inventors: Yehia M. El-Aini, Tequesta, FL (US); Robert J. Morris, Portland, CT (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 2 days.

(21) Appl. No.: 12/563,252

(22) Filed: Sep. 21, 2009

(65) Prior Publication Data

US 2011/0070085 A1 Mar. 24, 2011

(51) Int. Cl.
*F01D 5/10* (2006.01)
(52) U.S. Cl. ............... 416/146 R; 416/224; 416/229 R; 416/500
(58) Field of Classification Search ............ 416/146 R, 416/224, 229 R, 500; 415/119
See application file for complete search history.

(56) References Cited

U.S. PATENT DOCUMENTS

| | | | |
|---|---|---|---|
| 2,642,263 A * | 6/1953 | Thorp | 416/233 |
| 2,689,107 A * | 9/1954 | Odegaard | 416/233 |
| 4,519,745 A * | 5/1985 | Rosman et al. | 416/96 A |
| 5,112,193 A | 5/1992 | Greer et al. | |
| 5,205,713 A | 4/1993 | Szpunar et al. | |
| 5,232,344 A | 8/1993 | El-Aini | |
| 5,356,264 A * | 10/1994 | Watson et al. | 415/119 |
| 5,498,137 A * | 3/1996 | El-Aini et al. | 416/229 A |
| 6,039,533 A | 3/2000 | McCabe | |
| 6,039,542 A * | 3/2000 | Schilling et al. | 416/233 |
| 6,053,696 A | 4/2000 | Roberts | |
| 6,145,300 A | 11/2000 | Romani | |
| 6,149,380 A | 11/2000 | Kuzniar et al. | |
| 6,155,789 A | 12/2000 | Mannava et al. | |
| 6,217,277 B1 | 4/2001 | Liu et al. | |
| 6,227,794 B1 | 5/2001 | Wojtyczka et al. | |
| 6,299,410 B1 | 10/2001 | Hilbert et al. | |
| 6,409,469 B1 | 6/2002 | Tse | |
| 6,652,222 B1 | 11/2003 | Wojtyczka et al. | |
| 6,695,574 B1 | 2/2004 | Mather | |
| 6,895,741 B2 | 5/2005 | Rago et al. | |
| 6,973,193 B1 | 12/2005 | Tse et al. | |
| 6,991,428 B2 | 1/2006 | Crane | |
| 7,128,536 B2 * | 10/2006 | Williams et al. | 416/229 R |
| 7,156,621 B2 | 1/2007 | Stone | |
| 7,204,676 B2 | 4/2007 | Dutton et al. | |
| 7,353,588 B2 | 4/2008 | Crain et al. | |
| 7,360,997 B2 | 4/2008 | Wagner et al. | |
| 7,399,158 B2 | 7/2008 | Care et al. | |
| 7,399,159 B2 | 7/2008 | Matheny et al. | |
| 7,492,910 B1 | 2/2009 | Kashani | |
| 7,540,450 B2 | 6/2009 | Brand et al. | |

\* cited by examiner

*Primary Examiner* — Ninh H Nguyen
(74) *Attorney, Agent, or Firm* — Carlson Gaskey & Olds P.C.

(57) ABSTRACT

A blade includes an airfoil portion which defines at least one cavity with a damper located within the cavity, the damper includes a corrugated surface.

24 Claims, 3 Drawing Sheets

INTERNALLY DAMPED BLADE

BACKGROUND

The present disclosure relates to gas turbine engines and, more particularly, to damping mechanisms which reduce vibratory stress levels in the rotor blades thereof.

Gas turbine engines typically have rows of circumferentially spaced airfoils mounted on respective rotor disks for rotation about an engine axis. Advanced configurations feature shroudless hollow airfoils manufactured of light weight materials. The airfoils are designed to high tolerances to accommodate significant operational requirements such as cross-winds and inlet distortion. These requirements result in airfoils that may be prone to high vibratory responses and possible aeroelastic instability within some operational speed ranges. To mitigate these effects, the airfoils may need to be damped.

SUMMARY

A blade according to an exemplary aspect of the present disclosure includes an airfoil portion which defines at least one internal cavity and a damper located within the internal cavity, the damper includes a corrugated surface configured to provide a chordwise mode damping and a bending mode damping.

A blade according to an exemplary aspect of the present disclosure includes an airfoil portion which defines at least one internal cavity and a damper located within the internal cavity, the damper includes a corrugated surface wherein the damper is configured to provide a multi-mode damping.

A blade according to an exemplary aspect of the present disclosure includes an airfoil portion which defines at least one internal cavity and a damper located within the internal cavity, the damper includes a corrugated surface wherein the damper deforms in response to a centrifugal load to fit said internal cavity.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
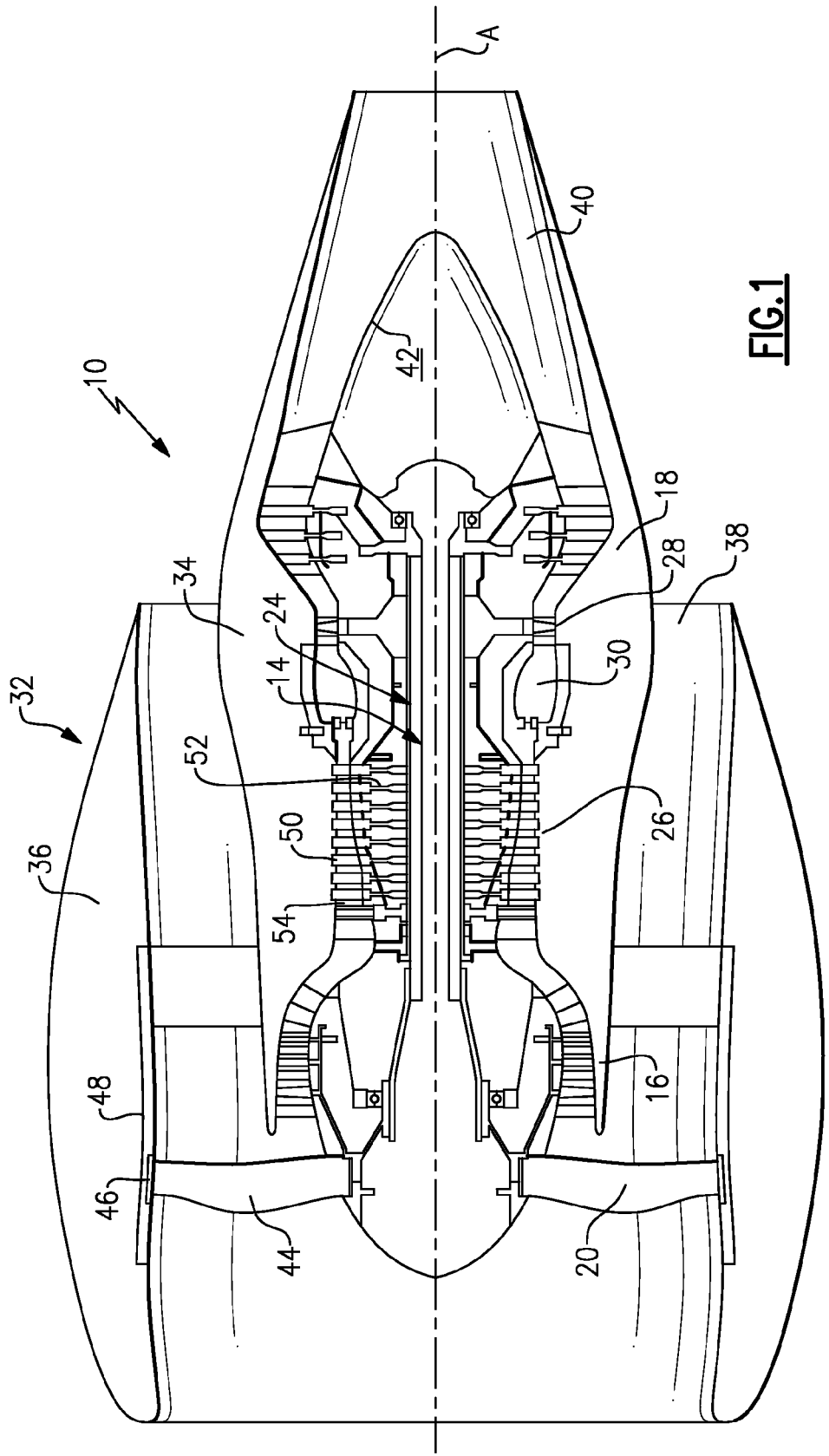
FIG. 1 is a general schematic view of an exemplary gas turbine engine for use with the present disclosure.

FIG. 1 illustrates a general schematic view of a gas turbine engine 10 such as a gas turbine engine for propulsion. The exemplary engine 10 in the disclosed non-limiting embodiment is in the form of a two spool high bypass turbofan engine. While a particular type of gas turbine engine is illustrated, it should be understood that the disclosure is applicable to other gas turbine engine configurations, including, for example, gas turbines for power generation, turbojet engines, low bypass turbofan engines, turboshaft engines, etc.

The engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a gear train. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The exemplary engine 10 is mounted within a nacelle assembly 32 defined by a core nacelle 34 and a fan nacelle 36. The bypass flow fan air is discharged through a fan nozzle section 38 generally defined between the core nacelle 34 and a fan nacelle 36. Air compressed in the compressor 16, 26 is mixed with fuel, burned in the combustor 30, and expanded in the turbines 18, 28. The air compressed in the compressors 16, 18 and the fuel mixture expanded in the turbines 18, 28 may be referred to as a hot gas stream along a core gas path. The core exhaust gases are discharged from the core engine through a core exhaust nozzle 40 generally defined between the core nacelle 34 and a center plug 42 disposed coaxially therein around an engine longitudinal centerline axis A.

The fan section 20 includes a plurality of circumferentially spaced fan blades 44 which may be made of a high-strength, low weight material such as an aluminum alloy, titanium alloy or combinations thereof. An annular blade containment structure 46 is typically disposed within a fan case 48 which circumferentially surrounds the path of the fan blades 44 to receive blade fragments which may be accidentally released and retained so as to prevent formation of free projectiles exterior to fan jet engine 10.

The compressor 16, 26 includes alternate rows of rotary airfoils or blades 50 mounted to disks 52 and static airfoils or vanes 54 which at least partially define a compressor stage. It should be understood that a multiple of disks 52 may be contained within each engine section and that although a single fan stage is illustrated and described in the disclosed embodiment, other stages which have other blades inclusive of fan blades, high pressure compressor blades and low pressure compressor blades may also benefit herefrom.

Figure 2:
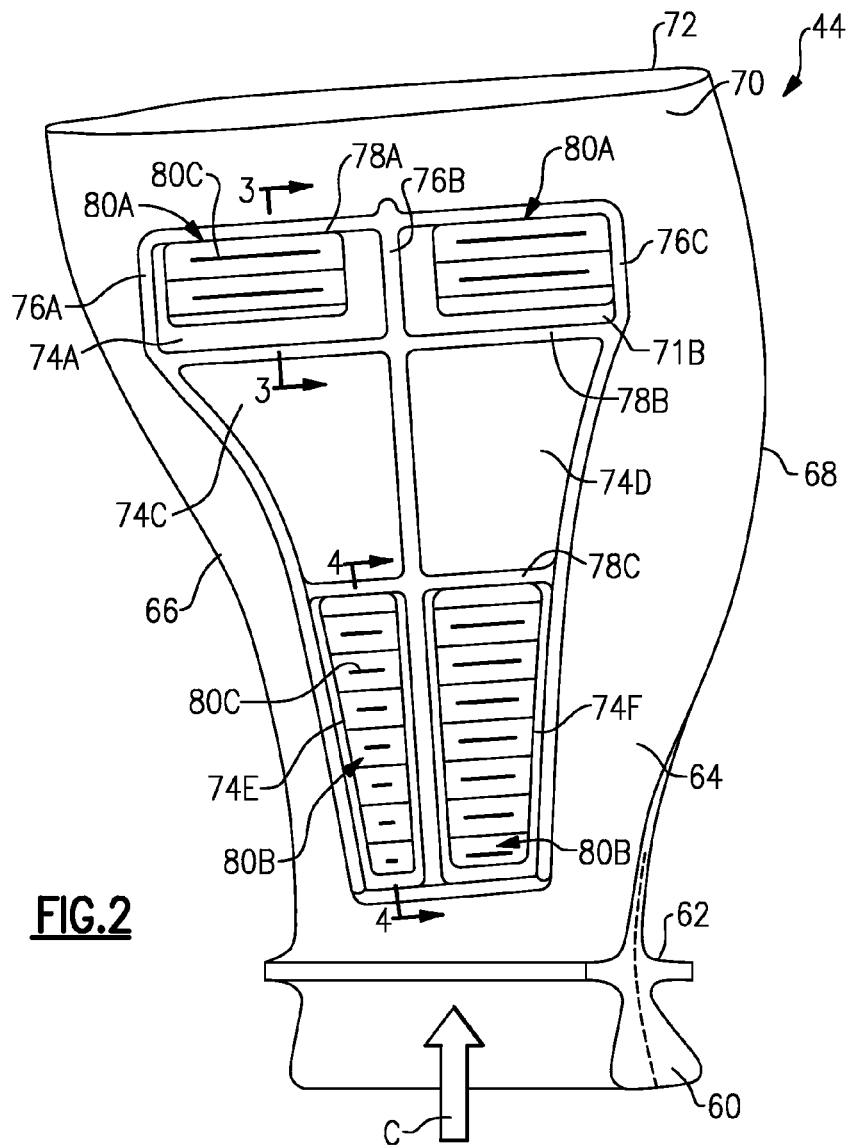
FIG. 2 is a schematic view of a fan blade.

Referring to FIG. 2, the fan blade 44 generally includes an innermost root portion 60, an intermediate platform portion 62, and an outermost airfoil portion 64. In one form, the root portion 60 defines an attachment such as an inverted "fir tree"-like shape, bulb, or dovetail so the fan blade 44 is slidably received in a complimentary configured recess provided in the fan rotor 20. The platform portion 62 generally separates the root portion 60 and the airfoil portion 64 to define an inner boundary of the air flow path. The airfoil portion 64 defines a blade chord between a leading edge 66, which may be swept forward as illustrated, and a trailing edge 68. A concave pressure side 70 and a convex suction side 72 are defined between the leading edge 66 and the trailing edge 68. Although a fan blade 44 is illustrated in the disclosed non-limiting embodiment, it should be understood that compressor blades, turbofan blades, turboprop propeller blades, tilt rotor props and other airfoils may benefit herefrom.

The airfoil portion 64 is at least partially hollow and includes a multiple of internal cavities 74A-74F which are defined by a multiple of spanwise ribs 76A-76C and a multiple of chordwise ribs 78A-78C. The fan blade 44 is typically manufactured in at least two sides such as the concave pressure side 70 and the convex suction side 72 which are assembled together to form the internal cavities 74A-74F.

A damper 80 is located within one or more of the internal cavities 74A-74F. The damper 80 may be manufactured of a relatively lightweight, stiff material which is tailored to provide maximum damping for the intended mode. Whereas the airfoil portion 64 may be manufactured in at least two sides, the damper 80 is readily incorporated within the respective internal cavities 74A-74F.

Figure 3:
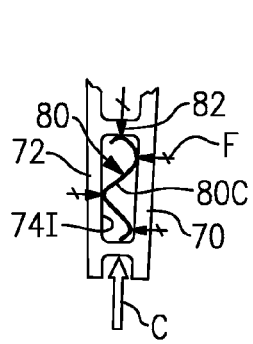
FIG. 3 is a sectional view taken along line 3-3 in FIG. 2 to illustrate a chordwise mode damper.
Figure 4:
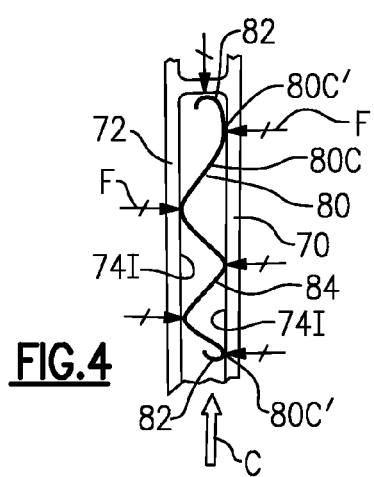
FIG. 4 is a sectional view taken along line 4-4 in FIG. 2 to illustrate a bending mode damper.

In one non-limiting embodiment, the damper 80 is a corrugated sheet metal strip which defines a corrugated surface 80C. The damper 80 is oriented such that a peak-to-peak thickness of the corrugated surface 80C is defined along the thickness of the airfoil portion 64 between the concave pressure side 70 and the convex suction side 72, the corrugated surface 80C along the corrugations arranged chordwise between the leading edge 66 and the trailing edge 68 (FIGS. 3 and 4). That is, the corrugated surface 80C is generally transverse to the leading edge 66, the trailing edge 68 and a longitudinal axis L spanwise along the fan blade 44 (FIGS. 3 and 4).

The damper 80 may include curved end sections 82 to minimize any contact stresses upon the inner surface of the airfoil portion 64 and the ribs 76, 78. In one non-limiting embodiment, the material thickness of the damper 80 may be in the range of 0.015 to 0.030 inches (0.4-0.8 mm). In addition, the damper may also include a coating 84 such as a non-metallic coating which minimizes wear upon an inner surface 74I of the of the internal cavities 74A-74F and the ribs 76, 78.

The dampers 80 introduce damping for a respective chordwise mode (FIG. 3) and bending mode (FIG. 4). The internal cavities 74A-74F within which the dampers are located may be selected to produce maximum damping for fundamental and complex chordwise bending vibration modes. Generally, the dampers 80A for damping the chordwise mode have a chord which is greater than a span while the dampers 80B for damping the bending mode have a span which is greater than a chord. It should be understood that various dampers geometries may be provided for a desired damping effect.

The dampers 80 are oriented (FIGS. 3 and 4) such that a centrifugal force (illustrated schematically by arrow C) along the span of the airfoil portion 64 will cause each damper 80 to load up against a respective chordwise ribs 78A and 78C so as to develop a normal contact force F between at least one corrugation 80C' of the corrugated surface 80C and an inner surfaces 74I of the internal cavities 74A-74F. In one non-limiting embodiment, the damper 80 may be sized to be essentially loose within the internal cavities 74A-74F such that when no centrifugal force C exists, no contact forces F exist between the damper 80 and the inner surfaces 74I of the internal cavities 74A-74F. That is, the contact forces F are developed under application of the centrifugal force C. It should be understood that other contact force arrangements may alternatively or additionally be provided.

Figure 5:
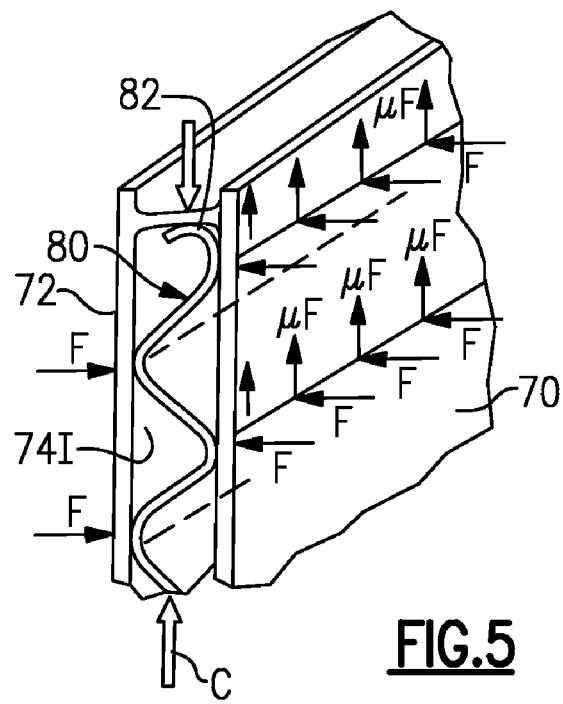
FIG. 5 is a perspective view to illustrate the loads on the damper as it slips against the airfoil.
Figure 6:
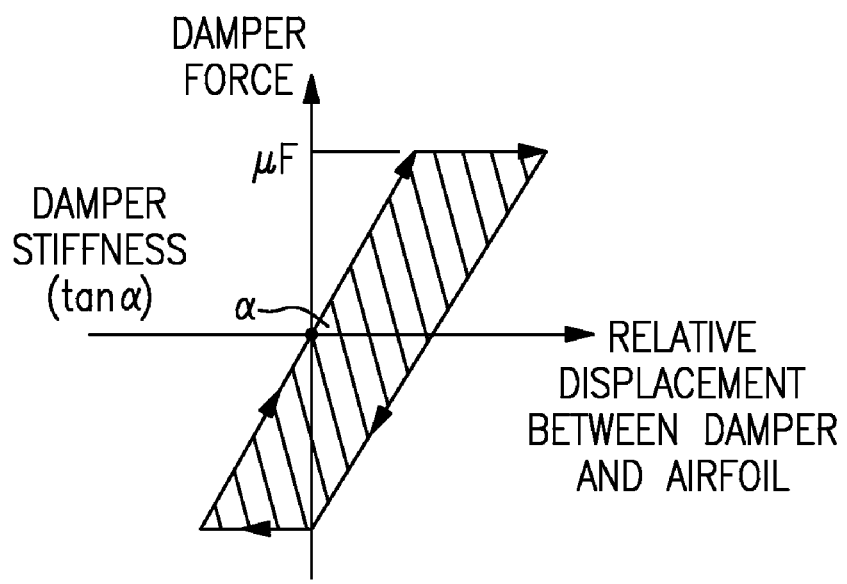
FIG. 6 is a schematic illustration of energy dissipation due to work done by friction force μF over one cycle of vibration.

As the airfoil portion 64 vibrates in a given mode of vibration and deforms, the damper 80, not being an integral part of the airfoil portion 64, will deform independently. As the amplitude of vibration increases, the damper 80 will begin to slip within the respective internal cavities 74A-74F due to the contact friction force μF, shown in FIG. 5), generated between the damper corrugated surface 80C and the inner surfaces 74I of the internal cavities 74A-74F being overcome, where μ is a coefficient of friction between the damper and the airfoil on the order of 0.1 to 0.6. That is, the deflections of the damper 80 produces elastic forces which, when the contact friction force μF is exceed, the damper 80 will slip within the internal cavities 74A-74F so as to dampen the vibration through frictional heating. The energy dissipation during one cycle of vibration is represented by the shaded area in FIG. 6. It should be noted that the direction of the friction force μF will change from radial in the case of a fundamental bending mode to a chordwise direction for a chordwise mode. It should also be noted that for the same corrugated damper, the stiffness in the radial direction is different from that of the chordwise direction.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A blade comprising:
   an airfoil portion which defines at least one internal cavity, said internal cavity at least partially bounded by a chordwise rib; and
   a damper located within said internal cavity, said damper includes a corrugated surface transverse to a span of the airfoil portion, said corrugated surface configured to provide a chordwise mode damping and a bending mode damping.

2. The blade as recited in claim 1, wherein said airfoil portion extends from a platform portion of a fan blade.

3. The blade as recited in claim 1, wherein said internal cavity is at least partially bounded by a spanwise rib.

4. The blade as recited in claim 1, wherein said damper is oriented such that a peak-to-peak thickness of said corrugated surface is defined along a thickness of said airfoil portion between a concave pressure side and a convex suction side of said airfoil portion.

5. The blade as recited in claim 1, wherein said corrugated surface is oriented generally transverse to a leading edge and a trailing edge of the airfoil portion.

6. The blade as recited in claim 1, wherein said damper includes a curved end section which abuts said chordwise rib.

7. The blade as recited in claim 1, wherein said damper defines a material thickness in the range of 0.015 to 0.030 inches (0.4-0.8 mm).

8. The blade as recited in claim 1, further comprising anon-metallic coating on said damper.

9. The blade as recited in claim 1, wherein said damper includes a curved end section each of which abuts a chordwise rib.

10. The blade as recited in claim 1, wherein said damper is not integral with said airfoil portion.

11. The blade as recited in claim 1, wherein said damper is movable within said internal cavity.

12. The blade as recited in claim 1, wherein said damper is loosely fit within said internal cavity such that when no centrifugal force exists, no contact forces exist between said damper and an inner surface of said internal cavity.

13. The blade as recited in claim 1, wherein said damper is oriented such that a centrifugal force along said span of said airfoil portion causes said damper to load up against said chordwise rib so as to develop a normal contact force between at least one corrugation of said corrugated surface and an inner surface of said internal cavity.

14. A blade comprising:
    an airfoil portion which defines at least one internal cavity, said internal cavity at least partially bounded by a chordwise rib; and
    a damper located within said internal cavity, said damper includes a corrugated surface transverse to a span of the airfoil portion, said damper configured to provide a multi-mode damping.

15. The blade as recited in claim 14, wherein said multi-mode damping includes chordwise mode damping.

16. The blade as recited in claim 14, wherein said multi-mode damping includes bending mode damping.

17. The blade as recited in claim 14, wherein said corrugated surface is oriented generally transverse to a leading edge and a trailing edge of the airfoil portion.

18. The blade as recited in claim 14, wherein said multi-mode damping orients said damper such that a centrifugal force along said span of said airfoil portion causes said damper to load up against said chordwise rib so as to develop a normal contact force between at least one corrugation of said corrugated surface and an inner surface of said internal cavity.

19. A blade comprising:
    an airfoil portion which defines at least one internal cavity, said internal cavity least partially bounded by a chordwise rib; and
    a damper located within said internal cavity, said damper includes a corrugated surface transverse to a span of the airfoil portion, said damper deforms in response to a centrifugal force to fit said internal cavity.

20. The blade as recited in claim 19, wherein said fit is a friction fit under the centrifugal force.

21. The blade as recited in claim 19, wherein said fit is an interference fit under the centrifugal force.

22. The blade as recited in claim 19, wherein said damper is oriented such that a peak-to-peak thickness of said corrugated surface is defined along a thickness of said airfoil portion between a concave pressure side and a convex suction side of said airfoil portion to provide said fit.

23. The blade as recited in claim 22, wherein said corrugated surface is oriented generally transverse to a leading edge and a trailing edge of the airfoil portion.

24. The blade as recited in claim 19, wherein said damper deforms in response to said centrifugal force to fit said internal cavity such that said centrifugal force along said span of said airfoil portion causes said damper to load up against said chordwise rib so as to develop a normal contact force between at least one corrugation of said corrugated surface and an inner surface of said internal cavity.

* * * * *

UNITED STATES PATENT AND TRADEMARK OFFICE
CERTIFICATE OF CORRECTION

PATENT NO. : 7,955,054 B2  Page 1 of 1
APPLICATION NO. : 12/563252
DATED : June 7, 2011
INVENTOR(S) : Yehia M. El-Aini et al.

It is certified that error appears in the above-identified patent and that said Letters Patent is hereby corrected as shown below:

IN THE CLAIMS:

Claim 8, column 4, line 62: "anon" should read as --a non--

Signed and Sealed this
Twenty-third Day of August, 2011

David J. Kappos
*Director of the United States Patent and Trademark Office*